United States Patent [19]

Kodama et al.

[11] Patent Number: 5,290,855
[45] Date of Patent: Mar. 1, 1994

[54] THERMOPLASTIC RESIN COMPOSITION

[75] Inventors: Mikio Kodama, Hirakata; Motoichi Yano, Settsu; Satoshi Umeyama, Takatsuki; Takayoshi Fujiwara, Osaka; Katsuji Abe, Ibaraki, all of Japan

[73] Assignee: Sumitomo Dow Limited, Osaka, Japan

[21] Appl. No.: 834,233

[22] PCT Filed: Jun. 25, 1991

[86] PCT No.: PCT/JP91/00852

§ 371 Date: Feb. 21, 1992

§ 102(e) Date: Feb. 21, 1992

[87] PCT Pub. No.: WO92/00351

PCT Pub. Date: Jan. 9, 1992

[30] Foreign Application Priority Data

Jun. 25, 1990 [JP] Japan .................. 2-168081
Jun. 25, 1990 [JP] Japan .................. 2-168082

[51] Int. Cl.$^5$ ............................... C08L 67/02
[52] U.S. Cl. ........................ 525/64; 525/166
[58] Field of Search ........................... 525/64

[56] References Cited

U.S. PATENT DOCUMENTS

| 3,644,574 | 2/1972 | Jackson et al. | 524/177 |
| 3,954,903 | 5/1976 | Kudo et al. | 525/64 |
| 4,804,706 | 2/1989 | Kishida | 525/64 |
| 4,855,355 | 8/1989 | Hirai | 525/64 |
| 4,861,817 | 8/1989 | Erpelding et al. | 524/411 |
| 4,877,833 | 10/1989 | Kondo | 525/64 |
| 4,956,407 | 9/1990 | Funasaki et al. | 524/120 |

FOREIGN PATENT DOCUMENTS

| 47-030421 | 8/1972 | Japan . |
| 51-025261 | 7/1976 | Japan . |
| 59-011347 | 1/1984 | Japan . |
| 59-219362 | 12/1984 | Japan . |
| 60-063249 | 4/1985 | Japan . |
| 60-063250 | 4/1985 | Japan . |
| 63-254157 | 10/1988 | Japan . |

Primary Examiner—Patricia A. Short

[57] ABSTRACT

A thermoplastic resin composition comprising 100 parts by weight of a mixture of 10 to 85% by weight of a rubber-reinforced styrene resin, 5 to 50% by weight of a saturated polyester resin and 10 to 70% by weight of at least one copolymer selected from the group consisting of an α-methylstyrene copolymer and a maleimide copolymer, and 0.2 to 50 parts by weight of (D) an epoxy group-containing olefinic copolymer, wherein a content of the rubbery polymer in the composition is from 5 to 25% by weight.

The above thermoplastic resin composition is excellent in sharpness and also in heat resistance, chemical resistance and impact resistance.

1 Claim, No Drawings

THERMOPLASTIC RESIN COMPOSITION

FIELD OF THE INVENTION

The present invention relates to a thermoplastic resin composition which is excellent in sharpness and also in heat resistance, chemical resistance and impact resistance.

BACKGROUND ART

Styrene resins such as polystyrene, a styrene-acrylonitrile copolymer, an ABS resin and an AES or AAS resin which comprises, as a rubber component, an EPDM rubber or acryl rubber have good property balance and dimensional stability and widely used in various fields. Inter alia, the styrene resins find many applications in the automobile field. In this field, the resins should have resistance to, for example, gasoline or a braking oil, and improvement of such resistance is important. As a polymer having good chemical resistance, a saturated polyester resin is known. Since this resin has poor impact resistance, it is proposed to add the ABS resin to the polyester resin (cf. Japanese Patent Publication Nos. 30421/1972 and 25261/1976).

However, a composition of the ABS resin and the saturated polyester resin has insufficient impact strength and poor heat resistance.

In addition, a coating is applied on such composition for the purpose of decoration or improvement of weather resistance. However, sharpness of the coating is poor.

DISCLOSURE OF THE INVENTION

As a results of the extensive study by the present inventors to improve the properties of a composition comprising a rubber-reinforced styrene resin and a saturated polyester resin, it has been found that a composition comprising the rubber-reinforced styrene resin, the saturated polyester and two specific copolymers has excellent sharpness in addition to good heat resistance, impact resistance and chemical resistance, and the present invention has been completed.

Accordingly, the present invention provides a thermoplastic resin composition comprising 100 parts by weight of a mixture of
(A) 10 to 85% by weight of a rubber-reinforced styrene resin which is obtainable by graft polymerizing (ii) an aromatic vinyl compound and (iii) a cyanated vinyl compound and/or other vinyl compound in the presence of (i) a rubbery polymer,
(B) 5 to 50% by weight of a saturated polyester resin and
(C) 10 to 70% by weight of at least one copolymer selected from the group consisting of (C-1) an α-methyl-styrene copolymer which comprises (i) α-methylstyrene, (ii) a cyanated vinyl compound and optionally (iii) an aromatic vinyl compound (except α-methylstyrene) and/or an alkyl unsaturated carboxylate and (C-2) a maleimide copolymer comprising (i) a maleimide compound and (ii) an aromatic vinyl compound or a combination of an aromatic vinyl compound and other vinyl compound, and 0.2 to 50 parts by weight of (D) an epoxy group-containing olefinic copolymer comprising (i) an olefin and (ii) an epoxy group-containing unsaturated compound or a combination of an epoxy group-containing unsaturated compound and an ethylenically unsaturated compound, wherein a content of said rubbery polymer is from 5 to 25% by weight based on the total weight of the compositon (A+B C+D).

Rubber-reinforced resin (A)

The rubber reinforced resin (A) is a resin which is obtainable by graft polymerizing the aromatic vinyl compound (ii) and the cyanated vinyl compound and/or the other vinyl compound (iii) in the presence of the rubbery polymer (i).

A ratio of the rubbery polymer (i), the aromatic vinyl compound (ii) and the cyanated vinyl compound or the other vinyl compound (III) in the rubber-reinforced styrene resin is not critical. Preferably, an amount of the rubbery polymer is from 10 to 70% by weight, that of the aromatic vinyl compound is from 15 to 70% by weight, and that of the other vinyl compound is from 5 to 50% by weight.

Examples of the rubbery polymer are polybutadiene, styrene-butadiene copolymers, acrylonitrile-butadiene copolymers, ethylene-propylene copolymers, acrylate copolymers, chlorinated polyethylene and the like. They may be used alone or as a mixture thereof. The rubbery polymer may be prepared by emulsion polymerization, solution polymerization, suspension polymerization or bulk polymerization. In the case of the emulsion polymerization, a particle size of the rubbery polymer and a gel content are not limited. Preferably, an average particle size is from 0.1 to 1 μm, and the gel content is from 0 to 95%.

Examples of the aromatic vinyl compound are styrene, α-methylstyrene, o-methylstyrene, m-methylstyrene, p-methylstyrene, tert.-butylstyrene, α-methylvinyltoluene, dimethlstyrene, chlorostyrene, dichlorostyrene, bromostyrene, dibromostyrene, vinylnaphthalene and the like. They may be used alone or as a mixture thereof.

Among them, styrene and α-methylstyrene are preferred.

Examples of the other vinyl compound which may constitute the rubber-reinforced styrene resin together with the rubbery polymer and the aromatic vinyl compound are a cyanated vinyl compound such as acrylonitrile, methacrylonitrile, fumaronitrile, etc.; an unsaturated alkyl carboxylate such as methyl (meth)acrylate, ethyl (meth)acrylate, propyl (meth)acrylate, butyl (meth)acrylate, butyl (meth)-acrylate, 2-ethylhexyl (meth)acrylate, etc.; and the like. They may be used alone or as a mixture thereof. Among them, the cyanated vinyl compound is preferred.

A graft degree of the graft polymer is not critical. Preferably, it is from 25 to 150%. For the preparation of the graft polymer and the copolymer, conventional emulsion polymerization, suspension polymerization, bulk polymerization, solution polymerization or a combination thereof is used.

Saturated polyester resin (B)

Examples of the saturated polyester resin used in the present invention are polyethylene terephthalate, polybutylene terephthalate, polyester-ether block polymer comprising a hard segment of the polyester and a soft segment of the polyether, and the like. It may be prepared from 1,4-butanediol and terephthalic acid, or dimethyl terephthalate and ethylene glycol. The saturated polyester resins may be used alone or as a mixture thereof. Among them, polybutylene terephthalate is preferred.

α-Methylstyrene copolymer (C-1)

The α-methylstyrene copolymer is a copolymer of α-methylstyrene (i), the cyanated vinyl compound (ii) and optionally the aromatic vinyl compound (except α-methylstyrene) and/or the alkyl unsaturated carboxylate (iii).

A composition of the α-methylstyrene copolymer is not critical. Preferably, an amount of α-methylstyrene (i) is from 60 to 85% by weight, that of the cyanated vinyl compound (ii) is from 15 to 40% by weight, and that of the other compound is from 0 to 25% by weight.

An intrinsic viscosity of the α-methylstyrene copolymer in dimethylformamide at 30° C. is preferably from 0.3 to 1.0.

Examples of the compounds which constitute the α-methylstyrene copolymer are the same as those exemplified in connection with the rubber-reinforced styrene resin (A).

The α-methylstyrene copolymer may be prepared by emulsion polymerization, suspension polymerization, solution polymerization or bulk polymerization.

Maleimide copolymer (C-2)

The maleimide copolymer is a copolymer of the maleimide compound (i) and the aromatic vinyl compound or the combination of the aromatic vinyl compound and the other vinyl compound (ii).

A composition of the maleimide copolymer is not critical. Preferably, an amount of the maleimide compound (i) is from 5 to 65% by weight, and that of the vinyl compound (ii) is from 95 to 35% by weight. In particular, the copolymer comprises 5 to 60% by weight of the maleimide compound and 30 to 80% by weight of the aromatic vinyl compound and 10 to 50% by weight of the other vinyl compound.

An intrinsic viscosity in dimethylformamide at 30° C. of the maleimide copolymer is preferably from 0.4 to 1.0.

As the maleimide compound, not only maleimide but also N-arylmaleimide having, as a substituent, an aryl group such as a phenyl, methylphenyl, ethylphenyl or chlorophenyl group and N-alkylmaleimide having, as a substituent, an alkyl group such as a methyl or ethyl group are exemplified. They may be used alone or as a mixture thereof. Among them, N-phenylmaleimide is preferred.

Examples of the aromatic vinyl compound and the other vinyl compound are the same as those exemplified in connection with the rubber-reinforced styrene resin (A).

The maleimide copolymer may be prepared by emulsion polymerization, suspension polymerization, solution polymerization or bulk polymerization.

Epoxy group-containing olefinic copolymer (D)

The epoxy group-containing olefinic copolymer is a copolymer comprising the olefin (i) and the epoxy group-containing compound or the combination of the epoxy group-containing compound and the ethylenically unsaturated compound (ii).

A composition of the epoxy group-containing olefinic copolymer is not critical. Preferably, an amount of the olefin is from 99.95 to 5% by weight, that of the epoxy group-containing compound is from 0.05 to 95% by weight and that of the ethylenically unsaturated compound is from 0 to 40% by weight. In particular, the copolymer comprises 99 to 50% by weight of the olefin, 1 to 50% by weight of the epoxy group-containing compound and 0 to 30% by weight of the ethylenically unsaturated compound.

Examples of the olefin are ethylene, propylene, butene-1, 4-methylpentene-1 and the like. They may be used alone or as a mixture thereof. Among them, ethylene is preferred.

The epoxy group-containing compound is a compound having an unsaturated group which is copolymerizable with the olefin and the ethylenically unsaturated compound, and the epoxy group in a molecule.

Examples are unsaturated epoxy compounds such as unsaturated glycidyl esters, unsaturated glycidyl ethers, epoxyalkenes and p-glycidylstyrenes which are represented by the following formulas (I), (II) and (III):

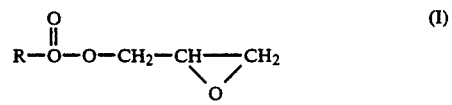

wherein R is a $C_2$-$C_{18}$ hydrocarbon group having an ethylenically unsaturated bond;

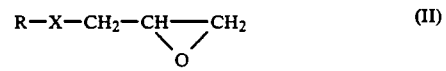

wherein R is a $C_2$-$C_{18}$ hydrocarbon group having an ethylenically unsaturated bond, and X is

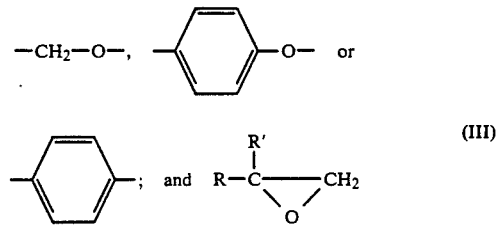

wherein R is a $C_2$-$C_{18}$ hydrocarbon group having an ethylenically unsaturated bond, and R' is a hydrogen atom or a methyl group.

Specific examples are glycidyl acrylate, glycidyl methacrylate, glycidyl itaconates, butenecarboxylates, allyl glycidyl ether, 2-methylallyl glycidyl ether, styrene p-glycidyl ether, 3,4-epoxybutene, 3,4-epoxy-3-methyl-1-butene, 3,4-epoxy-1-pentene, 3,4-epoxy-3-methylpentene, 5,6-epoxy-1-hexene, vinylcyclohexene monooxide, p-glycidylstyrene and the like. They may be used alone or as a mixture thereof. Among them, glycidyl (meth)acrylate is preferred.

Examples of the ethylenically unsaturated compound are vinyl esters having 2 to 6 carbon atoms in an unsaturated carboxylic acid moiety, acrylate, methacrylate or maleate having 1 to 6 carbon atoms in an alcohol moiety, vinyl halogenides, vinyl ethers, N-vinyllactams, carboxylic acid amides and the like. Among them, the vinyl esters, in particular, vinyl acetate are preferred.

The epoxy group-containing compound may be prepared by various methods. For example, the unsaturated epoxy compound, the olefin and optionally the ethylenically unsaturated compound are reacted in the presence of a radical generator at a temperature of 40° to 300° C. under pressure of 5.0 to 4000 atm, or the unsaturated epoxy compound is mixed with polypropylene and irradiating the mixture with the gamma-ray under high vacuum to obtain the polymer.

Thermoplastic resin composition

The resin composition of the present invention comprises 100 parts by weight of a mixture of 10 to 85% by weight of the rubber-reinforced styrene resin (A), 5 to 50% by weight of the saturated polyester resin (B) and 10 to 70% by weight of the α-methylstyrene copolymer (C-1) and/or the maleimide copolymer (C-2), and 0.2 to 50 parts by weight of the epoxy group-containing olefinic copolymer (D), wherein the content of the rubbery polymer is from 5 to 25% by weight based on the total weight of the composition (A+B+C+D).

Outside the above ranges, it is impossible to obtain a composition which is excellent in sharpness, heat resistance, impact resistance and chemical resistance. In view of the levels of heat resistance, impact resistance and the chemical resistance and also the balance among them, preferably the composition comprises 20 to 70% by weight of the component (A), 10 to 40% by weight of the component (B) and 20 to 50% by weight of the component (C), and 1 to 20 parts by weight of the component (D) per 100 parts by weight of the total weight of the components (A), (B) and (C), and the content of the rubbery polymer is from 10 to 20% by weight.

A mixing consequence and states of the rubber-reinforced styrene resin (A), the unsaturated polyester resin (B), the α-methylstyrene copolymer (C-1) and/or the maleimide copolymer (C-2) and the epoxy group-containing olefinic copolymer (D) are not limited. The components (A), (B), (C) and (D) in the form of pellets, beads or powder may be simultaneously mixed, or at least two specific components are premixed and then the remaining component(s) are mixed. The mixing may be carried out by any of conventional mixing apparatuses such as a Banbury mixer, rolls and an extruder.

If desired, during mixing, any of conventional additives, reinforcing materials and fillers such as an antioxidant, a UV-light absorber, a light stabilizer, an antistatic agent, a lubricant, a dye, a pigment, a plasticizer, a flame retardant, a mold release agent, glass fibers, metal fibers, carbon fibers, metal flakes and the like may be added to the composition. In addition, other thermoplastic resin such as polyacetal, polycarbonate, polyamide, polyphenylene oxide, polymethyl methacrylate or polyvinyl chloride may be compounded.

EXAMPLES

The present invention will be explained in detail by following Reference Examples, Examples and Comparative Examples, which do not limit the scope of the present invention. In Examples, "parts" and "%" are by weight.

REFERENCE EXAMPLE 1

Rubber-reinforced styrene resin (A)

From a composition of Table 1, each resin was prepared.

REFERENCE EXAMPLE 2

Polyester resin (B)

(B): Polybutylene terephthalate (PBT)
Viscosity average molecular weight of 30,000

REFERENCE EXAMPLE 3

α-Methylstyrene copolymer (C-1)

From a composition of Table 2, each copolymer was prepared.

REFERENCE EXAMPLE 4

Maleimide copolymer (C-2)

From a composition of Table 3, each copolymer was prepared.

REFERENCE EXAMPLE 5

Epoxy group-containing copolymer (D)

From a composition of Table 4, each copolymer was prepared.

TABLE 1

| Component (parts) | ABS-1 | ABS-2 | AAS | AES |
|---|---|---|---|---|
| Rubber | PBDE*1 | PBDE*1 | AR*2 | EPDM*3 |
|  | 60 | 30 | 50 | 50 |
| Compound |  |  |  |  |
| STY*4 | 28 | 50 | 35 | 35 |
| ACN*5 | 12 | 20 | 15 | 15 |
| Grafting degree (%) | 35 | 68 | 50 | 52 |
| Polymerization manner | Emulsion | Emulsion | Emulsion | Suspension |

Notes:
*1 Polybutadiene having an average particle size of 0.45 m and a gel content of 83 %.
*2 Crosslinked polybutyl acrylate having an average particle size of 0.3 μm.
*3 An ethylene-propylene-ethylidene-norbornene terpolymer having an iodine number of 21, a Mooney viscosity of 75 and a propylene content of 50%.
*4 Styrene.
*5 Acrylonitrile.

TABLE 2

| Component (parts) | AMS-A | AMS-A-M |
|---|---|---|
| AMS*1 | 75 | 75 |
| ACN*2 | 25 | 15 |
| MMA*3 |  | 10 |
| Intrinsic viscosity*4 | 0.50 | 0.65 |
| Polymerization manner | Emulsion | Emulsion |

Notes:
*1 α-Methylstyrene.
*2 Acrylonitrile.
*3 Methyl methacrylate.
*4 In dimethylformamide at 30° C.

TABLE 3

| Component (parts) | NPMI-S-A | NPMI-S-A-M |
|---|---|---|
| NPMI*1 | 25 | 15 |
| STY*2 | 50 | 50 |
| ACN*3 | 25 | 20 |
| MMA*4 | — | 15 |
| Intrinsic viscosity | 0.63 | 0.58 |
| Polymerization manner | Emulsion | Emulsion |

Notes:
*1 N-phenylmaleimide.
*2 Styrene.
*3 Acrylonitrile.
*4 Methyl methacrylate.
*5 In dimethylformamide at 30° C.

TABLE 4

| Component (parts) | E-GMA | E-GMA-VA |
|---|---|---|
| E*1 | 90 | 80 |
| GMA*2 | 10 | 10 |
| VA*3 | 0 | 10 |
| MFR*4 | 3 | 7 |
| Polymerization manner | Bulk | Bulk |

Notes:
*1Ethylene.
*2Glycidyl methacrylate.
*3Vinyl acetate.
*4Melt flow index according to JIS K-6760 at 190° C.

EXAMPLES

The components (A) to (D) prepared in Reference Examples 1–5 were simultaneously mixed in a composition shown in Tables 5 and 6 to obtain each resin composition.

The properties of the resin composition are also shown in Tables 5 and 6.

The properties are measured as follows:

1) Impact strength
ASTM D-256, ¼ inch, notched Izod.
2) Heat resistance
ASTM D-648, ¼ inch, the load of 18.6 kg/cm².
3) Chemical resistance A test piece of 150 mm ×20 mm ×3 mm is molded and coated with dioctyl phthalate under strain of 1.5%. Then, the coated piece is heated in an oven kept at 80° C. for 48 hours and the presence of cracking is observed.

4) Sharpness

A flat plate of 90 mm ×150 mm ×3 mm is molded by injection molding and coated with an urethane paint "High-Urethane 5100" manufactured by Nippon Oil and Fat Co., Ltd. using a spray gun to a coating thickness of 30 μm.

The coated plate is baked in an oven kept at 65° C. for 30 minutes and sharpness of the coating is evaluated as follows:

(i) Sharpness of the coated surface is measured at an incident angle of 60 degrees using an image clarity testing machine "ICM-1D" manufactured by Suga Testing Machines Co., Ltd.

(ii) At a height of about 10 mm vertically above the coated surface, a metal bar is placed and an image the bar on the coated surface is observed with naked eyes and evaluated according to the following criteria:

O: The image of the metal bar is clearly seen in the form of a line on the coated surface and the image is good.

X: The image of the metal bar is blurred in a wave form on the coated surface.

TABLE 5

| Composition No. | E.1 | E.2 | C.3 | E.4 | C.5 | E.6 | E.7 | C.8 | E.9 | C.10 | E.11 | C.12 |
|---|---|---|---|---|---|---|---|---|---|---|---|---|
| Composition: | | | | | | | | | | | | |
| Rubber-reinforced styrene resin (A) | | | | | | | | | | | | |
| ABS-1 | 20 | 20 | 20 | 30 | 30 | | | | | | | |
| ABS-2 | | | | | | 50 | 50 | 50 | | | | |
| AAS | | | | | | | | | 30 | 30 | | |
| AES | | | | | | | | | | | 40 | 40 |
| Saturated polyester resin (B) | | | | | | | | | | | | |
| PBT | 30 | 40 | 40 | 30 | 30 | 30 | 20 | 30 | 35 | 35 | 30 | 30 |
| α-Methylstyrene copolymer (C-1) | | | | | | | | | | | | |
| AMS-A | 50 | 40 | 40 | | | 20 | | 20 | 35 | 35 | | |
| AMS-A-M | | | | 40 | 40 | | 30 | | | | 30 | 30 |
| Epoxy group-cont. olefinic polymer (D) | | | | | | | | | | | | |
| GMA-E | 2 | 5 | | | | | 7 | | 5 | | | |
| GMA-E-VA | | | | 5 | | 2 | | | | | 5 | |
| Rubber content (%) | 11.7 | 11.4 | 12.0 | 17.1 | 18.0 | 14.7 | 14.0 | 15.0 | 14.2 | 15.0 | 19.0 | 20.0 |
| Impact strength (kg·cm/cm) | 18 | 22 | 12 | 27 | 17 | 23 | 21 | 15 | 22 | 14 | 31 | 17 |
| Heat resistance (°C.) | 98 | 95 | 91 | 95 | 96 | 90 | 93 | 87 | 92 | 90 | 92 | 90 |
| Chemical resistance | No | No | No | No | Yes | No | No | Yes | No | No | No | Yes |
| Sharpness (%) | | | | | | | | | | | | |
| (i) | 90 | 91 | 81 | 95 | 82 | 92 | 94 | 84 | 93 | 80 | 94 | 80 |
| (ii) | O | O | X | O | X | O | O | X | O | X | O | X |

TABLE 6

| Composition No. | C.13 | E.14 | C.15 | E.16 | C.17 | E.18 | C.19 | E.20 | C.21 | C.22 | E.23 | E.24 |
|---|---|---|---|---|---|---|---|---|---|---|---|---|
| Composition: | | | | | | | | | | | | |
| Rubber-reinforced styrene resin (A) | | | | | | | | | | | | |
| ABS-1 | 20 | 20 | 20 | 20 | 30 | 30 | | | | | | |
| ABS-2 | | | | | | | 50 | 50 | 50 | 10 | | |
| AAS | | | | | | | | | | | 30 | |
| AES | | | | | | | | | | | | 30 |
| Saturated polyester resin (B) | | | | | | | | | | | | |
| PBT | 30 | 30 | 40 | 40 | 30 | 30 | 20 | 20 | 50 | 50 | 30 | 40 |
| Maleimide copolymer (C-1) | | | | | | | | | | | | |

TABLE 6-continued

| Composition No. | C.13 | E.14 | C.15 | E.16 | C.17 | E.18 | C.19 | E.20 | C.21 | C.22 | E.23 | E.24 |
|---|---|---|---|---|---|---|---|---|---|---|---|---|
| AMS-A | 50 | 50 | | | 40 | 40 | | | | 40 | | 30 |
| AMS-A-M | | | 40 | 40 | | | 30 | 30 | | | 40 | |
| Epoxy group-cont. olefinic polymer (D) | | | | | | | | | | | | |
| GMA-E | | 2 | | | | 5 | | | 5 | 2 | | 7 |
| GMA-E-VA | | | | 5 | | | | 7 | | | 5 | |
| Rubber content (%) | 12.0 | 11.7 | 12.0 | 11.4 | 18.0 | 17.1 | 15.0 | 14.0 | 14.2 | 2.9 | 14.2 | 14.0 |
| Impact strength (kg · cm/cm) | 12 | 18 | 10 | 22 | 12 | 25 | 11 | 23 | 14 | 7 | 19 | 24 |
| Heat resistance (°C.) | 104 | 105 | 95 | 97 | 98 | 101 | 90 | 93 | 75 | 90 | 97 | 96 |
| Chemical resistance | Yes | No | No | No | Yes | No | Yes | No | No | No | No | No |
| Sharpness (%) | | | | | | | | | | | | |
| (i) | 80 | 90 | 81 | 95 | 80 | 91 | 85 | 92 | 82 | 84 | 94 | 92 |
| (ii) | X | O | X | O | X | O | X | O | X | X | O | O |

Effects of the Invention

As described above, the resin composition of the present invention achieves good sharpness and has excellent balance among the physical properties such as impact resistance, heat resistance and chemical resistance, and is industrially very useful.

What is claimed is:

1. A thermoplastic resin composition comprising 100 parts by weight of a mixture of
   (A) 20 to 70% by weight of a rubber-reinforced styrene resin which is obtained by graft polymerizing styrene and acrylonitrile in the presence of a rubbery polymer selected from the group consisting of polybutadiene, ethylene-propylene-diene monomer rubber and acrylate copolymers,
   (B) 10 to 40% by weight of polybutylene terephthalate,
   (C) 20 to 50% by weight of maleimide copolymer comprising (i) 5 to 60% by weight of N-phenylmaleimide, (ii) 30 to 80% by weight of styrene and (iii) 10 to 50% by weight of acrylonitrile or of acrylonitrile and methyl methacrylate, and
   1 to 20 parts by weight of (D) an epoxy group-containing olefinic copolymer prepared from components consisting of 99 to 50% by weight of ethylene, 1 to 50% by weight of glycidyl methacrylate and of 0 to 30% by weight of vinyl acetate wherein the content of said rubbery polymer is from 10 to 20% by weight based on the total weight of the composition (A+B+C+D).

* * * * *